(12) United States Patent
Nelms, Jr.

(10) Patent No.: US 6,374,031 B1
(45) Date of Patent: Apr. 16, 2002

(54) PENETRATOR FOR BLOWN OPTICAL FIBER AND METHOD RELATING THERETO

(76) Inventor: James C. Nelms, Jr., 1 Crawford Pkwy. Suite 1807, Portsmouth, VA (US) 23704

(*) Notice: Subject to any disclaimer, the term of this patent is extended or adjusted under 35 U.S.C. 154(b) by 0 days.

(21) Appl. No.: 09/535,194

(22) Filed: Mar. 27, 2000

Related U.S. Application Data

(60) Provisional application No. 60/156,702, filed on Sep. 30, 1999.

(51) Int. Cl.[7] .................................................. G02B 6/00
(52) U.S. Cl. ..................................... 385/138; 385/139
(58) Field of Search ................................ 385/138, 139, 385/147, 115

(56) References Cited

U.S. PATENT DOCUMENTS

| | | |
|---|---|---|
| 3,825,320 A | 7/1974 | Redfern |
| 3,951,515 A | 4/1976 | Allard |
| 4,214,809 A | 7/1980 | Reh |
| 4,682,846 A | 7/1987 | Cowen |
| 4,767,173 A | 8/1988 | Priaroggia |
| 4,859,021 A * | 8/1989 | Wall ............................ 385/138 |
| 4,891,640 A * | 1/1990 | Ip ................................ 385/138 |
| 5,151,967 A * | 9/1992 | Ebinuma ..................... 385/138 |
| 5,155,795 A | 10/1992 | Wasserman et al. |
| 5,588,086 A | 12/1996 | Fan |

* cited by examiner

Primary Examiner—Phan T. H. Palmer
(74) Attorney, Agent, or Firm—Joy L. Bryant

(57) ABSTRACT

The present invention is a penetrator for passing blown optical fiber through a pressure-proof boundary. The penetrator comprises a cylinder for attachment substantially in line with an opening in the boundary. The cylinder has a proximal and a distal end cap, a cylinder wall, and a central passage or dip tube for optical fibers. The central passage has substantially the same cross-sectional area as the opening in the boundary. The dip tube is sealed to each end cap and has distal and proximal tee fittings for injecting sealing materials into the dip tube. The tee fittings are joined by a length of optical fiber duct therebetween. The invention permits the optical fiber duct circuit to be easily changed.

30 Claims, 1 Drawing Sheet

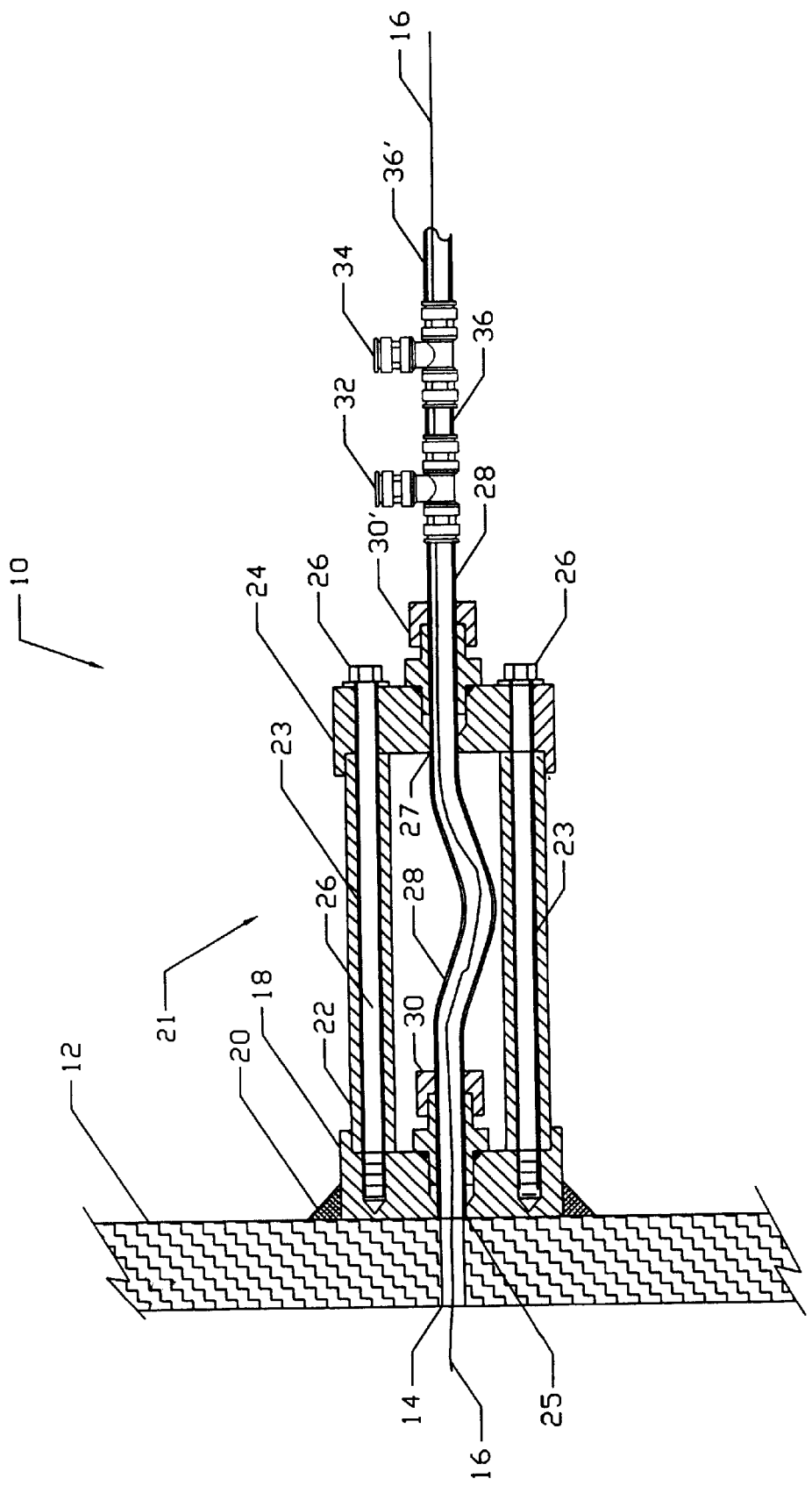

PENETRATOR FOR BLOWN OPTICAL FIBER AND METHOD RELATING THERETO

CROSS-REFERENCE TO RELATED APPLICATIONS

This application claims the benefit of U.S. Provisional Application No. 60/156,702 filed Sep. 30, 1999 and is incorporated by reference herein.

FIELD OF THE INVENTION

The present invention is related to blown optical fiber. In particular, it is related to a penetrator and method for passing blown optical fiber through a pressure-proof boundary.

BACKGROUND OF THE INVENTION

The method and apparatus for blowing optical fiber into ducts are well known. The method entails constructing an optical fiber duct circuit using duct designed for this purpose. Optical fiber is then blown from one point in the circuit to another using a special blow head. Depending on the desired application, more than one optical fiber may be blown through the duct at the same time.

In some instances, it is necessary to carry the optical fiber circuit through a pressure-proof boundary. When this is the case, it is important to ensure that the optical fiber circuit does not become a pathway for leakage across the boundary.

Several methods for passing optical fiber through pressure-proof boundaries have been described in U.S. Pat. Nos. 5,588,086; 4,214,809; 3,825,320; 3,951,515; 4,767,173; and 5,155,795 which are incorporated by reference herein. None of these methods make it possible to blow optical fiber(s) through a penetrator. Either each optical fiber is passed singly through the penetrator or the fiber itself does not actually cross the pressure-proof boundary. In some instances, the signal is carried across the boundary by a glass medium. When the penetrator is employed, the opening in the pressure-proof boundary must be as large or larger than the part that carries the optical fiber, or that carries the signal. This is in contrast to the present invention, where the fiber/signal carrying part has the same cross-sectional area as the opening in the boundary. Therefore, with respect to pressure vessels, the opening in the boundary may be smaller than or no larger than the maximum opening requiring reinforcement yet it may permit one to a plurality of fibers to be blown across the boundary.

U.S. Pat. No. 4,682,846 discloses a penetrator where the opening in the boundary is about the same size as the optical fiber. A glass plug forms the pressure boundary in this penetrator. In turn, the optical fiber does not cross the boundary and the penetrator cannot be used for blowing an optical fiber or multiple fibers. Also, because the boundary is glass, the amount of pressure that can be sustained by the plug coupled with the durability of the seal under hard use conditions is questionable. The present invention overcomes these problems and offers other advantages such as permitting easy upgrading through replacement of some of the penetrator parts and blowing new optical fibers while maintaining the integrity of the boundary. In addition, the invention does not employ exotic or expensive parts, materials, or manufacturing processes. Rather the invention offers an inexpensive, and efficient installation method and equipment.

SUMMARY OF THE INVENTION

The present invention is a penetrator for passing blown optical fiber through a pressure-proof boundary. The penetrator comprises a cylinder for attachment substantially in line with an opening in the boundary. The cylinder has a proximal and a distal end cap, a cylinder wall, and a central passage or dip tube for optical fibers. The central passage has substantially the same cross-sectional area as the opening in the boundary. The dip tube is sealed to each end cap and has distal and proximal tee fittings for injecting sealing materials into the dip tube. The tee fittings are joined by a length of optical fiber duct therebetween.

In use, the proximal end cap of the penetrator is attached to the boundary in line with an opening in the boundary. An optical fiber duct circuit is attached to the side of the boundary opposite from the proximal end cap and in sealing relationship with the opening in the boundary. An optical fiber duct is attached to the distal tee fitting to complete an optical fiber duct circuit. Optical fiber is blown through the optical fiber duct circuit to a terminal. A damming material is injected into the distal tee fitting and a sealing material is injected into the proximal tee fitting to fill the central passage or dip tube.

The objects and advantages of the invention will be set forth in part in the description which follows, and in part will be obvious from the description, or may be learned by practice of the invention. The objects and advantages of the invention will be obtained by means of instrumentalities in combinations particularly pointed out in the appended claims.

BRIEF DESCRIPTION OF THE DRAWINGS

The accompanying drawing illustrates a complete embodiment of the invention according to the best mode so far devised for the practical application of the principles thereof. The invention is shown in cross-section except for the fittings (32 and 34).

DETAILED DESCRIPTION OF THE PREFERRED EMBODIMENT

Referring now to the drawing, the penetrator 10 comprises a cylinder 21 for attachment to the boundary 12 substantially in line with an opening in the boundary 14. The cylinder 21 has a central passage, shown as a dip tube 28, for the optical fibers 16. The central passage 28 has substantially the same cross-sectional area as the opening in the boundary 12. The cylinder 21 has a proximal end cap 18 and a distal end cap 24. Each end cap 18, 24 has a central opening 25, 27. The end caps 18, 24 are held in a sealing relationship with the cylinder 21 by fasteners 26 passing through the distal end cap 24, longitudinally through the wall 22 of the cylinder 21, and secured to the proximal end cap 18. The figure depicts the preferred fastener, a screw 26, passing through the distal end cap 24, screw holes 23, and screwing into threaded holes in the proximal end cap 18. Although screws are the preferred fastener, any fastener known to those of ordinary skill in the art may be employed. The cylinder 21 is attached to the boundary 12 with the central opening 25 of the proximal end cap 18 aligned with the opening in the boundary 14. Any method of attachment known to those of ordinary skill in the art may be employed such as the use of adhesives or other bonding or welding agents. Preferably, the cylinder 21 is attached to the boundary 12 by welding the proximal end cap 18 to the boundary 12.

When the central passage 28 comprises a dip tube (as shown), the dip tube 28 is sealed to each end cap 18, 24 in line with each central opening 25, 27. Any method known to those of ordinary skill in the art may be used to seal the dip tube to each end cap. Preferably, the dip tube 28 is sealed to the end caps 18, 24 by modified standard flareless tube fittings 30, 30' that are screwed into each end cap 18, 24. Note that the dip tube 28 passes through the flareless tube fitting 30 in the distal end cap 24 and protrudes from the distal end cap 24.

The cross-sectional area of the dip tube 28 is no larger than the opening in the boundary. This is important because in pressure vessel applications, the size of the opening is limited, where larger sized openings require reinforcement. For example, the largest opening allowed in a bulkhead application is 0.612 inches (15.5 mm) in diameter without requiring reinforcement. The small dip tube overcomes problems presented with prior solutions where the pressure-proofing components are concentric to the fiber/signal carrying part because these configurations require an opening in the boundary that must be larger than the fiber/signal carrying part and require reinforcement.

The fittings 32, 34 for injecting sealing materials into the dip tube 28 may be mounted in line with the dip tube 28. The figure depicts a proximal tee fitting 32 and a distal tee fitting 34 mounted in line with the dip tube 28 as it protrudes from the distal end cap 24. The tee fittings 32, 34 are joined by a length of optical fiber duct 36 therebetween. The optical fiber duct 36 continues the fiber duct circuit. One example of the optical fiber duct suitable for the present invention may be the 8 mm optical fiber duct which is commonly used on ships. The proximal tee fitting 32 serves as an injection fitting to introduce sealing material into the dip tube 28 and the distal tee fitting 34 serves as a dam fitting for introducing damming material into the optical fiber duct 36.

The penetrator 10 described above may be employed for blowing optical fiber(s) through a pressure-proof boundary such as a bulkhead of a ship or in the wall of a nuclear reactor pressure vessel. An opening 14 is made in the boundary 12 typically by any method known to those of ordinary skill in the art such as drilling. When the penetrator 10 is attached to the boundary 12, no part of the penetrator 10 is located inside the boundary 12. All of the pressure-proofing components are outside the boundary. Depending on the application, a second penetrator 10 may be mounted on the opposite side of the boundary 12. The proximal end cap 18 of the penetrator 10 is attached to the boundary 12 in line with the opening. Any method known to those of ordinary skill in the art may be used to attach the proximal end cap 18 to the boundary but preferably it is attached by welding. An optical fiber duct circuit is attached to a side of the boundary 12 opposite from the proximal end cap 18 and in sealing relationship with the opening in the boundary 14. When the central passage comprises a dip tube 28, the dip tube 28 is inserted in a center opening 19 in the proximal end cap 18 and sealed in place, preferably by a first standard flareless fitting 30. The flareless fitting 30 has been modified by drilling out the center to accept the dip tube 28. The dip tube 28 is mounted with its dip in a downward direction. The cylinder 21 having longitudinal fastener openings 23 in the wall 22 is positioned over the proximal end cap 18. A distal end cap 24 having a central opening 27 and peripheral fastener openings is positioned over the distal end of the cylinder 21. The distal end of the dip tube 28 is inserted through the central opening 27 and the peripheral fastener openings are in line with the longitudinal fastener openings 23 in the cylinder wall 22. A second flareless tube fitting 30' is used to seal the dip tube 28 to the distal end cap 24. Cylinder fasteners 26 (shown as screws) are inserted through the distal end cap 24, the cylinder wall 22, and into the proximal end cap 18. The cylinder fasteners 26 are then tightened to seal the cylinder 21 to both end caps 18, 24. Optionally, a third flareless tube fitting is used to seal an optical fiber duct to the boundary on a side opposite from the penetrator 10.

A proximal tee fitting 32 is attached to the outer end of the dip tube 28 and is joined to a distal tee fitting 34 by a length of optical fiber duct 36. Additional optical fiber duct 36' is attached to the distal tee fitting 34 to complete an optical fiber duct circuit. Optical fiber is blown through the circuit to a terminal. The optical fiber may be blown in either direction through the boundary 12 and the penetrator 10. A damming material is injected into the distal tee fitting 34 and a dip tube sealing material is injected through the proximal tee fitting 32 to fill the dip tube 28 and seal the optical fiber(s) 16 to the dip tube 28. The damming material may be any material known to those of ordinary skill in the art such as a silicone rubber. The dip tube sealing material is preferably a polyurethane.

To further prevent leakage, a cylinder sealing material may be applied between the cylinder and the end caps. Examples of the material include but are not limited to a gasket, a caulk and combinations thereof.

Depending on the final application of the invention, a second penetrator may be mounted on a side of the boundary opposite from the first penetrator and in place of the third flareless tube fitting and optical fiber duct.

The invention permits the optical fiber duct circuit to be easily changed. The tee fittings 32, 34 are cut. The flareless fitting 30' is removed along with the screws 26, end cap 24, and cylinder wall 22. The flareless fitting 30 is removed along with the dip tube 28. This removes the optical fibers from the circuit. The penetrator 10 may be reconstructed using a new dip tube 28, tee fittings 32, 34, and optical fiber duct where necessary. New optical fiber is blown through the circuit and the dip tube is sealed as before.

The above description and drawings are only illustrative of preferred embodiments which achieve the objects, features and advantages of the present invention, and it is not intended that the present invention be limited thereto. Any modification of the present invention which comes within the spirit and scope of the following claims is considered part of the present invention.

What is claimed is:

1. A penetrator for passing blown optical fibers through a pressure-proof boundary, the penetrator comprising:
    a cylinder for attachment to the boundary substantially in line with an opening in the boundary, the cylinder having a central passage for the optical fibers, wherein the central passage has substantially the same cross sectional area as the opening in the boundary;
    wherein the cylinder has a proximal end cap and a distal end cap, each end cap having a central opening, and wherein the end caps are held in a sealing relationship with the cylinder by fasteners passing through the distal end cap, longitudinally through the wall of the cylinder, and secured to the proximal end cap.

2. A penetrator according to claim 1, wherein the cylinder is attached to the boundary with the central opening of the proximal end cap aligned with the opening in the boundary.

3. A penetrator according to claim 2, wherein the proximal end cap is welded to the boundary.

4. A penetrator according to claim 3, wherein the central passage comprises a dip tube sealed to each end cap in line with each central opening.

5. A penetrator according to claim 4, wherein the dip tube is sealed to the end caps by modified standard flareless tube fittings screwed into each end cap.

6. A penetrator according to claim 5, wherein the dip tube passes through the flareless tube fitting and protrudes from the distal end cap.

7. A penetrator according to claim 3, further comprising fittings for injecting sealing materials into the dip tube.

8. A penetrator according to claim 7, wherein the fittings for injecting sealing materials into the dip tube comprise a proximal tee fitting and a distal tee fitting mounted in line with the dip tube wherein the dip tube protrudes from the distal end cap, the tee fittings joined by a length of optical fiber duct therebetween.

9. A penetrator according to claim 8, wherein the proximal tee fitting serves as an injection fitting to introduce a sealing material into the dip tube and the distal tee fitting serves as a dam fitting to introduce a damming material into the optical fiber duct.

10. A penetrator according to claim 1, wherein the fasteners are screws.

11. A method of blowing optical fiber through a pressure-proof boundary, the method comprising the steps of:
   a) providing a penetrator comprising a cylinder having a central passage and proximal and distal end caps, the central passage extending through the distal end cap and sealed thereto, and proximal and distal tee fittings in line with the central passage, each tee fitting joined by a length of optical fiber duct;
   b) attaching the proximal end cap to the boundary in line with an opening therein;
   c) attaching an optical fiber duct circuit to a side of the boundary opposite from the proximal end cap and in sealing relationship with the opening in the boundary;
   d) attaching optical fiber duct to the distal tee fitting to complete an optical fiber duct circuit;
   e) blowing optical fiber through the optical fiber duct circuit to a terminal;
   f) injecting a damming material into the distal tee fitting; and
   g) injecting a sealing material into the proximal tee fitting to fill the central passage.

12. A method according to claim 11, wherein the central passage comprises a dip tube.

13. A method according to claim 12, wherein the optical fiber duct circuit is changed by:
   a) removing the penetrator and leaving the proximal end cap attached to the boundary;
   b) removing and discarding the section of optical fiber duct containing the proximal and distal tee fittings;
   c) removing and discarding the dip tube; and
   d) removing and discarding the optical fibers in the circuit.

14. A method according to claim 13, comprising the step of replacing the dip tube, proximal tee fittings, distal tee fittings, and optical fibers.

15. A method according to claim 12, comprising the step of welding the proximal end cap to the boundary over the opening in the boundary.

16. A method of blowing optical fiber through a pressure-proof boundary, the method comprising the steps of:
   a) making an opening in the boundary;
   b) attaching an optical fiber duct circuit to one side of the boundary in sealing relationship with the opening in the boundary;
   c) welding a proximal end cap having a central opening to the other side of the boundary, wherein the central opening is in line with the opening in the boundary;
   d) attaching a dip tube in line with the central opening of the proximal end cap and in sealing relationship thereto;
   e) positioning a cylinder having walls with longitudinal fastener openings over the proximal end cap;
   f) positioning a distal end cap having a central opening and peripheral fastener openings over the distal end of the cylinder, wherein the distal end of the dip tube is inserted through the central opening and the peripheral fastener openings are in line with the longitudinal fastener openings in the cylinder wall;
   g) inserting cylinder fasteners through the distal end cap, the cylinder wall, and into the proximal end cap;
   h) tightening the cylinder fasteners to seal the cylinder to both end caps;
   i) attaching a proximal tee fitting to the outer end of the dip tube;
   j) joining the proximal tee fitting to a distal tee fitting by a length of optical fiber duct;
   k) attaching optical fiber duct to the distal tee fitting to complete an optical fiber duct circuit;
   l) blowing optical fiber through the circuit to a terminal;
   m) injecting a damming material into the distal tee fitting; and
   n) injecting a dip tube sealing material through the proximal tee fitting to fill the dip tube and seal the optical fiber to the dip tube.

17. A method according to claim 16, further comprising inserting a cylinder sealing material between the cylinder and the end caps.

18. A method according to claim 17, wherein the cylinder sealing material is either a gasket or a caulk.

19. A method according to claim 18, wherein the dip tube is sealed to the proximal end cap by a first flareless tube fitting; to the distal end cap by a second flareless tube fitting; and an optical fiber duct is sealed to the boundary on a side opposite from the penetrator by a third flareless tube fitting.

20. A method according to claim 19, wherein an identical penetrator is mounted in place of the third flareless tube fitting.

21. A method according to claim 20, wherein the optical fiber circuit is changed by:
   a) removing and discarding a section of optical fiber duct comprising the proximal and distal tee fittings;
   b) removing the cylinder fasteners, the distal end cap, and the cylinder;
   c) removing and discarding the dip tube from the proximal end cap; and
   d) removing and discarding the optical fibers in the circuit.

22. A method according to claim 21, comprising the step of replacing the dip tube, proximal tee fittings, distal tee fittings, optical fiber duct, and optical fibers.

23. A method according to claim 18, wherein the optical fiber circuit is changed by:
   a) removing and discarding a section of optical fiber duct comprising the proximal and distal tee fittings;
   b) removing the cylinder fasteners, the distal end cap, and the cylinder;
   c) removing and discarding the dip tube from the proximal end cap; and
   d) removing and discarding the optical fibers in the circuit.

24. A method according to claim 23, comprising the step of replacing the dip tube, proximal tee fittings, distal tee fittings, optical fiber duct, and optical fibers.

25. A method according to claim 16, wherein the optical fiber is blown in either direction through the boundary and the penetrator.

26. A method according to claim 25, wherein the optical fiber circuit is changed by:
   a) removing and discarding a section of optical fiber duct comprising the proximal and distal tee fittings;
   b) removing the cylinder fasteners, the distal end cap, and the cylinder;
   c) removing and discarding the dip tube from the proximal end cap; and
   d) removing and discarding the optical fibers in the circuit.

27. A method according to claim 26, comprising the step of replacing the dip tube, proximal tee fittings, distal tee fittings, optical fiber duct, and optical fibers.

28. A method according to claim 16, wherein the optical fiber circuit is changed by:
   a) removing and discarding a section of optical fiber duct comprising the proximal and distal tee fittings;
   b) removing the cylinder fasteners, the distal end cap, and the cylinder;
   c) removing and discarding the dip tube from the proximal end cap; and
   d) removing and discarding the optical fibers in the circuit.

29. A method according to claim 28, comprising the step of replacing the dip tube, proximal tee fittings, distal tee fittings, optical fiber duct, and optical fibers.

30. A method according to claim 16, wherein the damming material is a silicone rubber and the dip tube sealing material is a polyurethane.

* * * * *